United States Patent [19]

Lauer et al.

[11] Patent Number: 4,674,366

[45] Date of Patent: Jun. 23, 1987

[54] APPARATUS FOR ADJUSTING THE TIE ROD IN AN AUTOMOTIVE VEHICLE

[76] Inventors: Gerhard Lauer, Grosswaldstrasse 6, D-6686 Eppelborn; Alfred Morawietz, Zollstockstrasse 12, D-6610 Lebach; Jürgen Wild, Am Stehlsberg 4, D-6601 Riegelsberg, all of Fed. Rep. of Germany

[21] Appl. No.: 918,662

[22] Filed: Oct. 15, 1986

Related U.S. Application Data

[63] Continuation of Ser. No. 687,573, Dec. 28, 1984, abandoned.

[30] Foreign Application Priority Data

Dec. 31, 1983 [DE] Fed. Rep. of Germany ....... 3347697

[51] Int. Cl.[4] ............................................. B25B 21/00
[52] U.S. Cl. .................................. 81/57.14; 81/57.16; 81/57.19; 81/57.2; 81/57.22
[58] Field of Search ........................... 81/57.14–57.16, 81/57.19, 57.2, 56, 57.22, 57.3–57.36, 57.24

[56] References Cited

U.S. PATENT DOCUMENTS

| | | | |
|---|---|---|---|
| 4,106,371 | 8/1978 | Akiyoshi et al. | 81/57.14 |
| 4,125,040 | 11/1978 | True | 81/469 X |
| 4,170,908 | 10/1979 | Peveto et al. | 81/57.2 X |
| 4,261,232 | 4/1981 | Yamazaki | 81/57.36 X |
| 4,348,920 | 9/1982 | Boyadjieff | 81/57.16 X |
| 4,357,843 | 11/1982 | Peck et al. | 81/57.2 X |
| 4,376,396 | 3/1983 | Hayhoe | 81/57.14 |

FOREIGN PATENT DOCUMENTS 2644865 8/1980 Fed. Rep. of Germany .

*Primary Examiner*—Frederick R. Schmidt
*Assistant Examiner*—Debra S. Meislin
*Attorney, Agent, or Firm*—Peter K. Kontler

[57] ABSTRACT

The tie rod in the steering system of an automotive vehicle is adjusted by an apparatus whose housing contains two transmissions, one to rotate the tie rod and the other to rotate the lock nut which normally holds the tie rod in a selected angular position. The second transmission can rotate a wrench for the lock nut, and this wrench is slotted to allow for entry of a portion of the tie rod into its socket. A carriage is reciprocable in the housing to shift the wrench axially so that the socket of the wrench can receive or can be moved away from the lock nut.

9 Claims, 4 Drawing Figures

APPARATUS FOR ADJUSTING THE TIE ROD IN AN AUTOMOTIVE VEHICLE

This application is a continuation of application Ser. No. 687,573, filed Dec. 28, 1984, now abandoned.

BACKGROUND OF THE INVENTION

The present invention relates to apparatus for adjusting the tie rod in an automotive vehicle or a similar externally threaded component which is normally held against rotation by a lock nut. More particularly, the invention relates to improvements in apparatus of the type disclosed, for example, in German Pat. No. 26 44 865.

The aforementioned patent discloses a motor-driven apparatus which employs a set of friction wheels to rotate the tie rod and to thereby move the tie rod axially with attendant adjustment of the steering knuckles. However, the nut which locks the tie rod in a selected angular position must be rotated by hand with a customary wrench which is a time-consuming and tiresome operation.

OBJECTS AND SUMMARY OF THE INVENTION

An object of the invention is to provide a novel and improved apparatus which can be used to rotate an externally threaded component, such as the tie rod in the steering system of an automotive vehicle, as well as the nut which normally locks the component in a selected angular position.

Another object of the invention is to provide a portable power-operated tool which can be used with advantage in repair shops and/or in assembly plants for automotive vehicles to facilitate the selection of toe in or toe out of the wheels.

A further object of the invention is to provide the apparatus with novel and improved means for transmitting motion to parts which serve to rotate the externally threaded component and the nut.

An additional object of the invention is to provide the apparatus with novel and improved means for selecting the starting positions of various parts so as to simplify the application of the apparatus to the externally threaded component and the nut.

Still another object of the invention is to provide the apparatus with novel and improved means for facilitating its manipulation, especially the orientation of its support with reference to the parts which must be rotated for the purpose of adjustment or for the purpose of locking the externally threaded component in a selected position.

A further object of the invention is to provide an apparatus which simplifies the task of a mechanic or an assembly line worker and which is constructed and assembled in such a way that all operations which require the exertion of a reasonable or substantial effort can be performed by motors rather than by hand.

The invention resides in the provision of an apparatus which can assume the form of a portable power-operated tool and serves to change the angular position of an externally threaded component and of a nut which is in mesh with such component, particularly to change the angular position of an externally threaded tie rod in the steering system of an automotive vehicle and of a lock nut which normally holds the tie rod against rotation. The improved apparatus comprises a support, a motor-driven first transmission which is carried by the support and has a first output means movable into engagement with the externally threaded component to rotate the latter, and a powered second transmission which is also carried by the support and includes second output means movable into torque-transmitting engagement with the nut on the externally threaded component.

In accordance with a presently preferred embodiment, the first output means comprises a plurality of friction wheels which define a space for reception of a portion of the externally threaded component. At least one of the wheels is movable to and from an inoperative position in which it provides a path for introduction and withdrawal of a portion of the externally threaded component into and from the aforementioned space, and the first input means then further comprises a fluid-operated motor and resilient means or the like to move the one friction wheel to and from its inoperative position. When the one friction wheel is moved away from its inoperative position and at least one of the friction wheels is rotated, such wheels can transmit torque to the externally threaded component so as to effect an adjustment of steering knuckles. All of the friction wheels are preferably rotated in the same direction when they are in the process of rotating the externally threaded component.

The support preferably includes or constitutes a common housing for the two transmissions, and such housing is preferably formed with an open end which affords access to the first and second output means.

In accordance with a presently preferred embodiment of the invention, the second output means comprises a tubular wrench having a socket for the nut on the externally threaded component and a substantially radially extending slot which enables the wrench to move into and from a position in which it surrounds a portion of the externally threaded component and its socket registers with the nut on the externally threaded component. The second transmission then further comprises reversible means for rotating the wrench and the apparatus then further comprises reciprocating means for moving the wrench axially so as to effect entry of the nut into the socket and separation of the wrench from the nut. The means for rotating the wrench can comprise a plurality of driver gears and a driven gear which is coaxial and rigid with the wrench and has a slot in register with the slot of the wrench. The driven gear is in mesh with at least one of the driver gears in each angular position of the wrench. The axes of the friction wheels are parallel to the axis of the wrench and the reciprocating means preferably comprises a carriage for the wrench and the driven and driver gears as well as motor means for reciprocating the carriage relative to the support in at least substantial parallelism with the axes of the friction wheels. The means for rotating the wrench then preferably further comprises additional gears which are provided in or on the carriage and mesh with the driver gears as well as means for driving the additional gears. The means for reciprocating the carriage can comprise one or more cylinder and piston units, e.g., two pneumatically operated cylinder and piston units. The carriage can be provided with guide means for directing the externally threaded component into the aforementioned slots, and such guide means is preferably disposed radially outwardly of the slots and has surfaces converging toward the slots to ensure more or less automatic entry of a portion of the externally threaded component into the socket and into the aforementioned space when the support is moved relative to the component and/or vice versa.

The apparatus can further comprise holder means (e.g., two elongated arms) for the support and coupling means for connecting the support to the holder means so that the support is pivotable relative to the holder means about an axis which is normal to the axis of the wrench.

The apparatus can comprise a fluid-operated motor for the second transmission. Such motor, or another suitable motor, is preferably operated by a suitable control unit so as to place the slots in a predetermined angular position which is best suited for introduction of a portion of the externally threaded component into the wrench. Means can be provided to regulate the torque which is transmitted by the motor for the second transmission so as to select the force with which the lock nut is applied to hold the externally threaded component against rotation.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
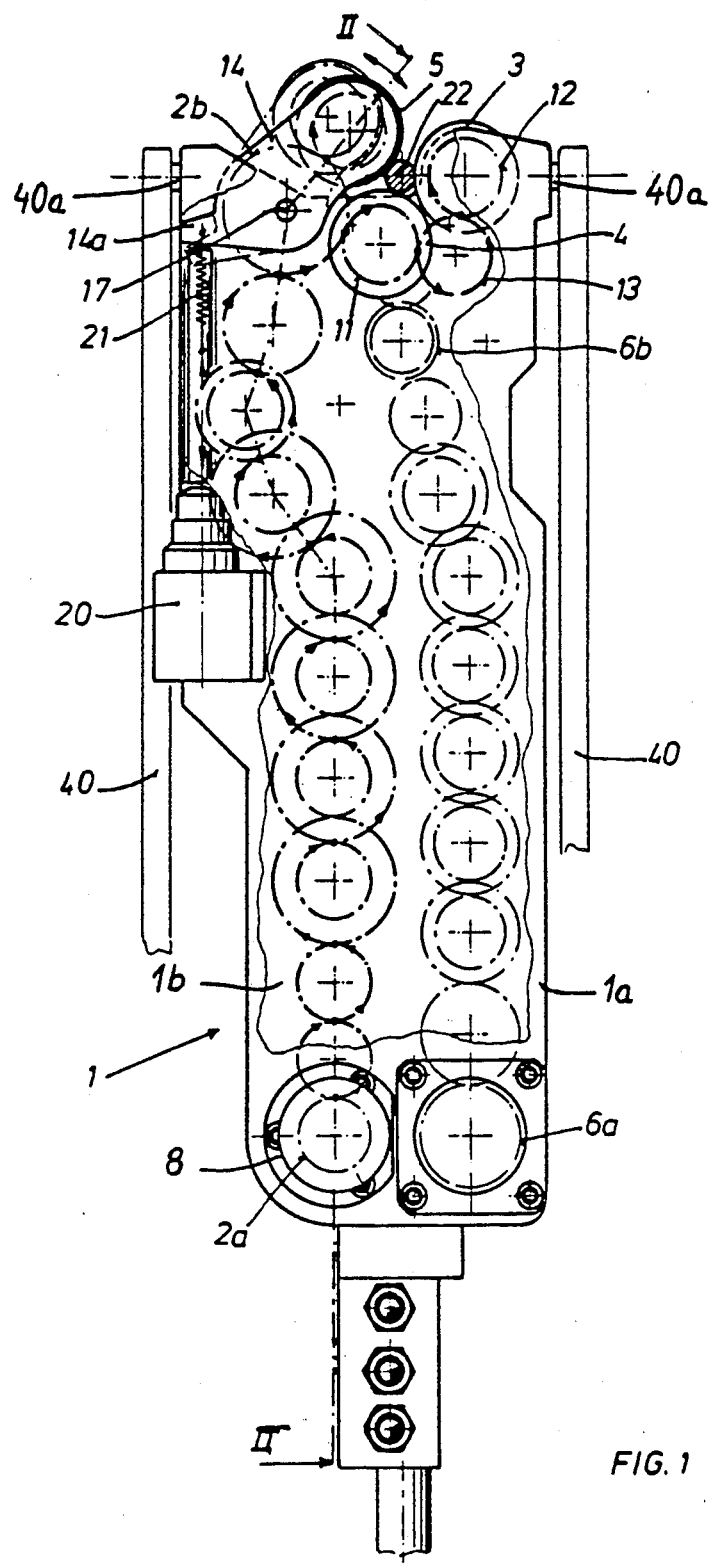
FIG. 1 is a schematic partly sectional and partly elevational view of an apparatus which embodies the invention, the section being taken in the direction of arrows as seen from the line I—I of FIG. 2.

The improved apparatus comprises an elongated slender support 1 in the form of a rather flat stepped housing one end (namely the upper end, as viewed in FIGS. 1 to 4) which is open so as afford access to the output means of two transmissions each of which is mounted in the interior of the housing. The housing or support 1 comprises a front wall 1a and a rear wall 1b, and these walls serve as bearings or contain bearings for the shafts of gears forming part of the two transmissions. The left-hand transmission of FIG. 1 comprises an input gear 2a which is driven by a preferably fluid-operated reversible (hydraulic or pneumatic) motor 8 and which transmits torque to a train of gears as shown in the left-hand portion of FIG. 1 and in FIG. 2. The output means of the first transmission includes a gear 2b which is disposed at the open end of the housing 1 and serves to transmit torque to three friction wheels 3, 4 and 5. The second transmission (see the right-hand portion of FIG. 1 or 3 and FIG. 4) includes a motor-driven input gear 6a adjacent to the input gear 2a and serving to transmit torque to a train of gears including a gear 6b at the open end of the housing 1. The gear 6b transmits torque to the rotary parts of the output means of the second transmission. Such output means includes a substantially tubular wrench 7 which is rotatable clockwise and counterclockwise and serves to transmit torque to a lock nut 25 (see FIG. 4) which meshes with the externally threaded portion 22a of an elongated rod-like component 22 constituting the tie rod in the steering system of an automotive vehicle. The friction wheels 3, 4 and 5 serve as a means for rotating the component 22 when the motor 8 is on. The motor 8 for the input gear 2a can be operated independently of the reversible motor 9 for the input gear 6a, i.e., the friction wheels 3, 4 and 5 can be rotated while the wrench 7 is idle and vice versa. The motor 9 is preferably a fluidoperated motor, e.g., a pneumatic motor. The motors 8 and 9 are mounted at the lower end of the housing 1, as viewed in FIGS. 1 to 4, and their starting and arresting means are not specifically shown in the drawing. Compressed air or a pressurized hydraulic fluid can be supplied to the motors 8 and 9 by way of one or more conduits which can be seen in the lower parts of FIGS. 1 to 4.

The first transmission including the input gear 2a and receiving motion from the motor 8 is designed to rotate the friction wheels 3, 4 and 5 in the same direction (clockwise or counterclockwise). The axes of the friction wheels 3 to 5 are disposed at the corners of a triangle (see FIG. 1) and the friction wheel 5 is movable (preferably pivotable about the axis of the gear 2b) between an operative position which is shown in FIG. 1 by solid lines and an inoperative position which is shown in FIG. 1 by phantom lines. The friction wheels 3 to 5 define a space (occupied in FIG. 1 by a portion of the component 22) which is accessible when the wheel 5 is pivoted to the inoperative position so that the component 22 can be introduced into the aforementioned space by moving the housing 1 upwardly toward the position which is shown in FIG. 1. The axes of the friction wheels 3 and 4 are fixed and the arrangement is such that, when the component 22 is received in the aforementioned space and the friction wheel 5 is moved to the operative position, the motor 8 can rotate the friction wheels 3-5 in the same direction through the medium of the gear train including the gears 2a and 2b of the first transmission. The friction wheels 3 and 4 are driven by the gear 2b through the medium of gears 11, 12 which are coaxial therewith and an intermediate gear 13. As shown in FIG. 1, the gear 2b drives the gear 11 which drives the gear 12 through the medium of the gear 13.

The means for moving the friction wheel 5 between its operative and inoperative positions comprises a two-armed lever 14 which is pivotable about the axis of the shaft 17 for the gear 2b. The friction wheel 5 is coaxial with a gear 18 which is in mesh with the gear 2b. One arm of the lever 14 carries the wheel 5 and its other arm 14a is engaged by a fluid-operated (e.g., hydraulic) servomotor 20 as well as a return spring 21. The latter tends to maintain the friction wheel 5 in the inoperative position. When the servomotor 20 is actuated, the friction wheel 5 is moved to the solid-line position of FIG. 1 and then cooperates with the friction wheels 3, 4 to rotate the component 22 as soon as the motor 8 is started to rotate the gear train including the gears 2a and 2b.

Figure 2:
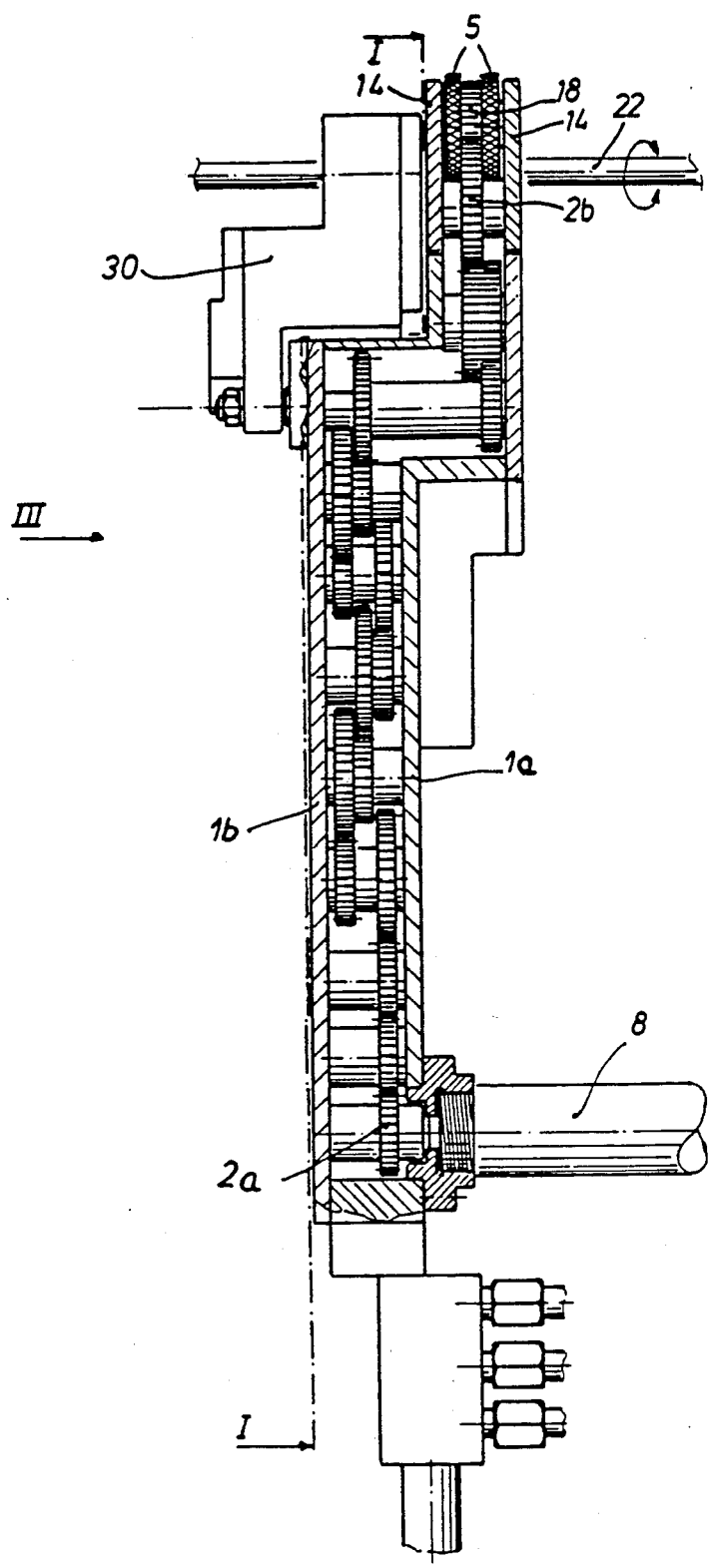
FIG. 2 is a sectional view as seen in the direction of arrows from the line II—II of FIG. 1.
Figure 3:
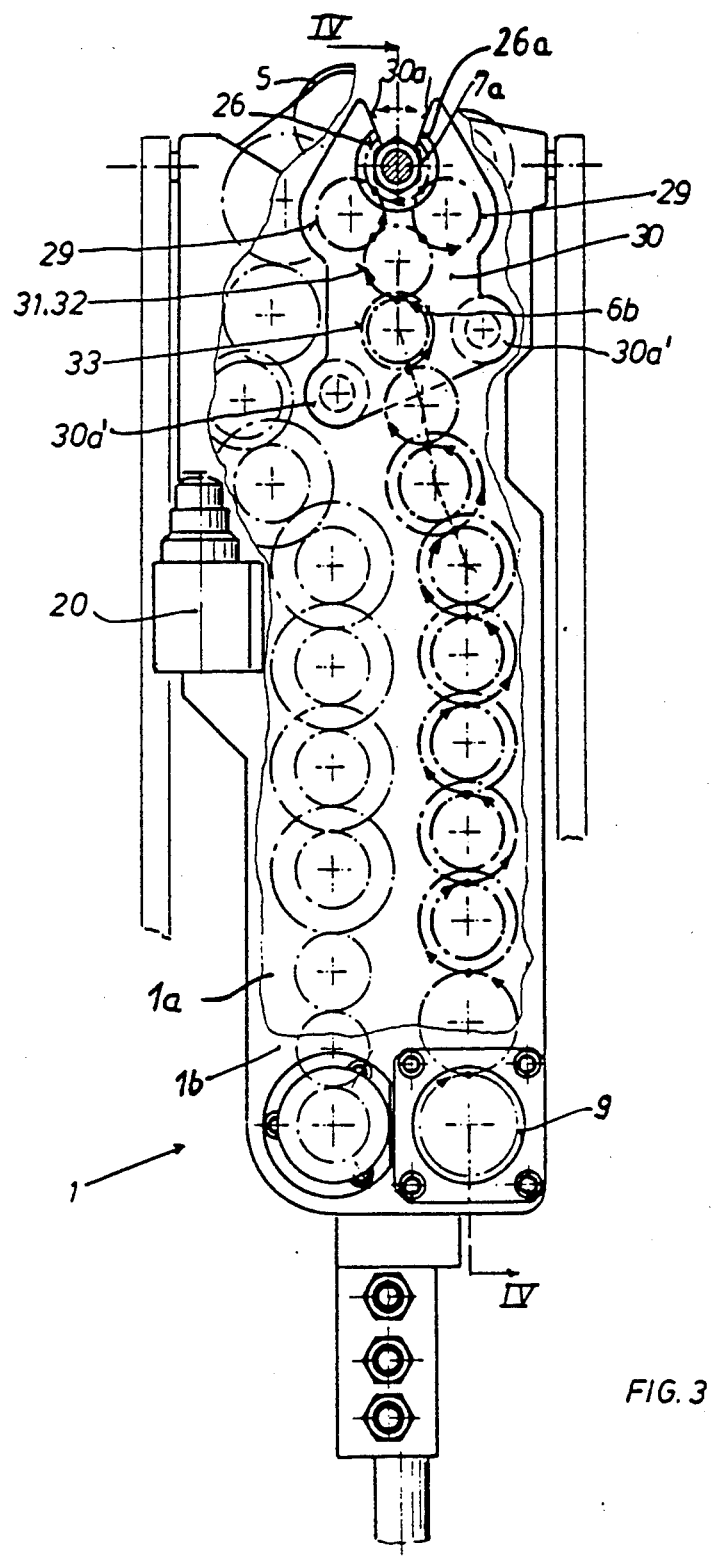
FIG. 3 is a view as seen in the direction of arrow III in FIG. 2.

When the spring 21 is free to maintain the friction wheel 5 in the inoperative position which is shown in FIG. 1 by phantom lines, the friction wheel 5 is sufficiently remote from the friction wheel 3 to allow for unimpeded entry of the component 22 into the space between the friction wheels 3, 4 in response to upward movement of the housing 1 toward and to the position which is shown in FIGS. 1 and 2. As mentioned above, a portion of the component 22 is confined in the just mentioned space as soon as the friction wheel 5 is returned to the operative position in response to actuation of the servomotor 20 whereby the peripheral surfaces of the friction wheels 3, 4 and 5 engage the component 22 with sufficient force to ensure that it is set in rotary motion in response to starting of the motor 8. The torque which is applied by the rotating friction wheels 3, 4 and 5 is taken up by the housing 1.

Figure 4:
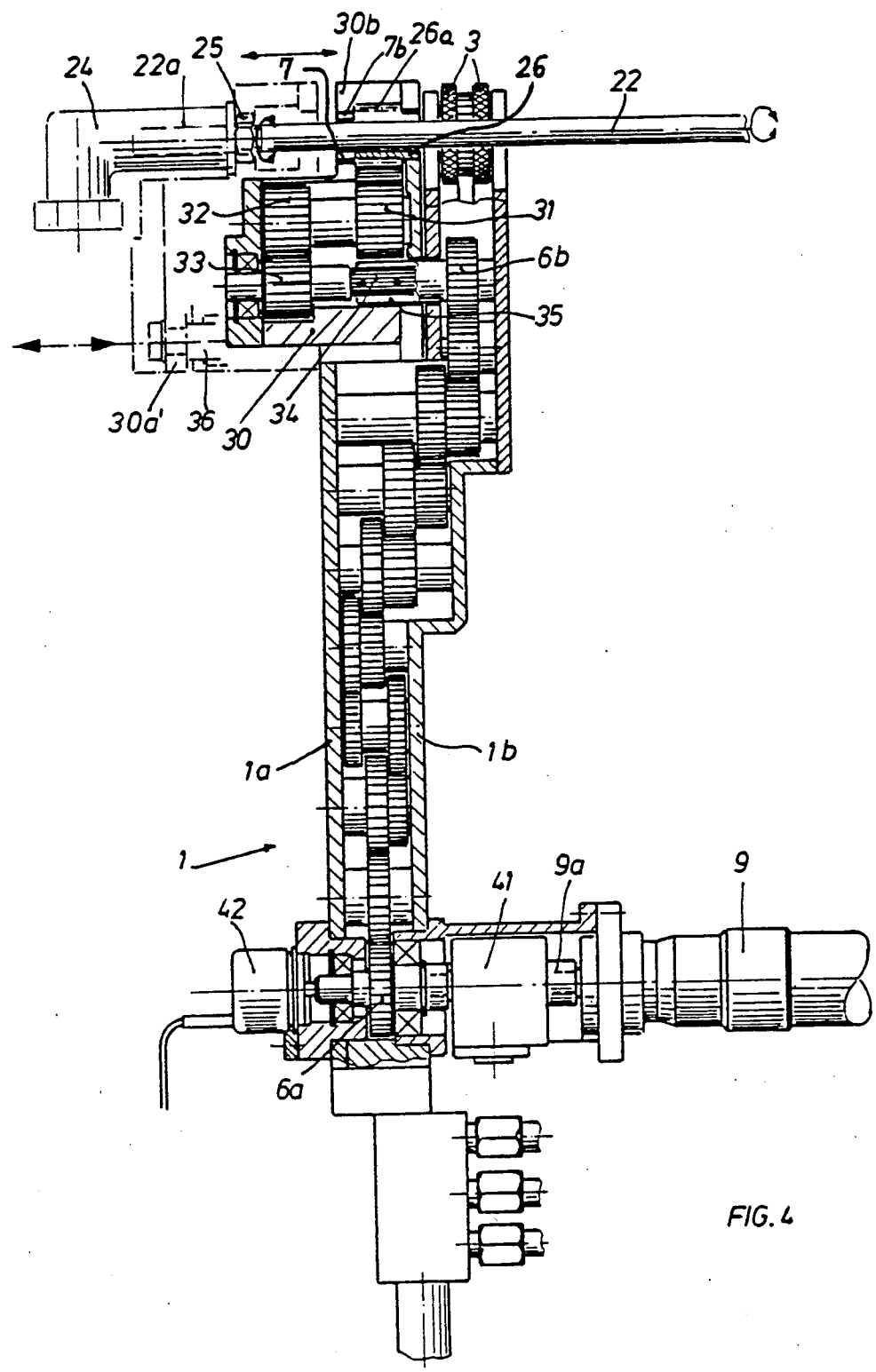
FIG. 4 is sectional view as seen in the direction of arrows from the line IV—IV of FIG. 3.

FIG. 4 shows that the externally threaded left-hand end portion 22a of the component 22 meshes with one arm of a steering knuckle 24 as well as with the hexagonal lock nut 25 which bears against the adjacent end face of the steering knuckle 24 and thereby holds the component 22 in selected angular position. The aforementioned tubular wrench 7 serves as a means for loosening the lock nut 25 prior to rotation of the component 22 and the resulting axial displacement of the parts 22, 24 relative to each other, and for tightening the nut 25 when the component 22 assumes the newly selected angular position. The second transmission is designed to rotate the wrench 7 in a clockwise and in a counterclockwise direction. The wrench 7 has a hexagonal socket 7a which can receive the lock nut 25 in response to axial movement of the wrench from the solid-line position to the phantom-line position of FIG. 4. When the component 22 is properly received in the space between the friction wheels 3, 4 and 5, the wrench 7 registers with the nut 25 and the latter can enter the socket 7a without any or after a relatively small angular movement of the wrench so that each of the six surfaces bounding the socket 7a is aligned with one of the six facets of the nut 25. The dimensions of the space between the friction wheels 3, 4 and 5 are determined by the diameter of the component 22, i.e., the positions of the fixedly mounted friction wheels 3 and 4 are functions of the diameter of the component 22.

The wrench 7 can be moved between the solid-line and phantom-line positions of FIG. 4 in response to corresponding displacement of the housing 1. However, and as shown in the drawing, it is presently preferred to move the wrench 7 axially with reference to the housing 1 and relative to the friction wheels 3, 4 and 5. As can be seen in FIG. 4, the wrench 7 surrounds the adjacent portion of the component 22 when the latter extends through the space between the friction wheels 3, 4 and 5. Therefore, it is necessary to provide the wrench 7 with a radial slot 7b which communicates with the socket 7a and allows for introduction of the component 22 into and its removal from the socket 7a. A slot 26a, which registers with the slot 7b of the wrench 7, is provided in a driven gear 26 which is rigid with and serves to transmit torque to the wrench 7. All that is necessary to introduce the component 22 into the socket 7a is to move the slots 7b and 26a to the positions of FIG. 3 in which they are aligned with the path between the friction wheels 4 and 5 when the friction wheel 5 is held in the inoperative position so that the component 22 can enter the space between the friction wheels 3–5 as well as the socket 7a of the wrench 7 in response to upward movement of the housing 1, as viewed in the drawing.

The means for reciprocating the wrench 7 into and from engagement with the lock nut 25 comprises a carriage 30 which includes an upper portion 30b constituting a guide means and having two downwardly sloping convergent guide surfaces 30a to facilitate penetration of a portion of the component 22 into the slots 7b, 26a and into the socket 7a of the wrench 7. The carriage 30 supports two driver gears 29 at least one of which is in mesh with the driven gear 26 in each angular position of the wrench 7 to thus ensure that the wrench can be rotated (clockwise or counterclockwise) irrespective of the angular position of the slot 7b and/or 26a. The means for transmitting torque from the gear 6b to the driver gears 29 comprises additional gears 31, 32, 33 which are rotatably mounted in the carriage 30. As can be seen in FIG. 4, the gear 33 has an externally splined shaft 34 in mesh with the internally splined shaft 35 of the gear 6b so that the latter can rotate the gear 33 irrespective of the position of the carriage 30 and wrench 7, as considered in the axial direction of the wrench. The carriage 30 is reciprocable in parallelism with the axes of the friction wheels 3, 4 and 5. The two driver gears 29 mate with the gear 31 which is coaxial with the gear 32, and the latter meshes with the gear 33 so that it can be driven by the gear 6b when the gear 6a of the second transmission receives torque from the motor 9.

The casing of the carriage 30 comprises two eyelets 30a' which are connected to the piston rods 36 of two fluid-operated (hydraulic or pneumatic) motors mounted on the housing 1. The cylinders and pistons of these motors are not referenced in the drawing for the sake of clarity. FIG. 4 shows one of the piston rods 36 in the axial position it assumes when the carriage 30 has been shifted to the left-hand end position which is indicated by phantom lines and in which the socket 7a of the wrench 7 receives the lock nut 25.

The housing 1 is mounted on a holder including two spaced apart arms 40 which are coupled to the housing 1 by two stub shafts 40a defining a pivot axis which is normal to the axis of the wrench 7 and to the axes of the friction wheels 3–5. Thus, the housing 1 can be said to constitute a pendulum whose upper end portion is fulcrumed between the upper end portions of the arms 40 of the holder to thus facilitate the engagement of the improved apparatus with the component 22 and the lock nut 25 thereon. An advantage of pivotable mounting of the housing 1 in the holder including the arms 40 is that the apparatus can orient itself automatically in dependency on the inclination or orientation of the component 22.

The output shaft 9a of the motor 9 for the second transmission including the gears 6a and 6b is operatively connected with a device 41 which selects and/or indicates its angular position as well as with a torque transmitting device 42. The devices 41, 42 cooperate to move or to facilitate movement of the shaft 9a to an angular position in which the socket 7a of the wrench 7 is properly aligned with the lock nut 25 so that the carriage 30 can be moved to the phantom-line position of FIG. 4 and/or in which the slots 7b and 26 extend upwardly from the axis of the nut 7.

The mode of operation of the improved apparatus is as follows:

The operator ensures that the motor 20 is idle so that the spring 21 is free to maintain the friction wheel 5 in the inoperative position as shown in FIG. 1 by phantom lines. The slots 7b and 26a of the wrench 7 and gear 26 extend upwardly so that the operator can manipulate the housing 1 (by holding the arms 40 of the holder) in order to ensure that the component 22 enters the socket 7a of the wrench 7 as well as the space between the fixedly mounted friction wheels 3 and 4. The surfaces 30a of the guide means 30b on the carriage 30 facilitate entry of the component 22 into the space between the friction wheels 3 and 4, such space being accessible by way of the path which is established by the friction wheel 5 while the latter dwells in the inoperative position. The device 41 and/or 42 ensures that the slots 7b and 26a face upwardly, as viewed in the drawing, when the motor 9 is idle so that one portion of the component 22 can enter the socket 7a while another portion of the component 22 enters the space between the friction wheels 3 and 4. The devices 41 and 42 can be replaced by or used in conjunction with a suitable limit switch (not shown) in order to ensure that the slots 7b and 26a assume optimum positions for admission of a portion of the component 22 into the socket 7a when the motor 9 is idle.

In the next step, the operator starts the servomotor 20 so that the latter overcomes the resistance of the spring 21 and moves the friction wheel 5 to the operative position in which the wheels 3, 4 and 5 cooperate to rotate the component 22 in response to starting of the motor 8. The fluid-operated motors including the piston rods 36 are then started to move the carriage 30 and the wrench 7 from the solid-line to the phantom-line positions of FIG. 4 so that the socket 7a receives the lock nut 25 on the component 22. The wrench 7 is caused to perform a small angular movement if the socket 7a is not in exact alignment with the lock nut 25. This can be achieved by starting the motor 9 at a low speed and/or by manually turning the housing 1 about the component 22 through the medium of the arms 40.

Since the angular position of the lock nut 25 is not defined (i.e., the angular position can be any one of a practically infinite number of angular positions), it is often advisable to place the nut 25 into a predetermined angular position prior to adjustment of the axial position of the component 22 in an assembly plant. This can be achieved by rotating the lock nut 25 in a direction to the left, as viewed in FIG. 4, so that it touches slightly the adjacent end face of the steering knuckle 24. At such time, as well as during the ensuing rotation of the nut 25 through one or more revolutions in a direction to move away from the steering knuckle, the motor 20 ensures that the friction wheels 3–5 engage the component 22 with a force which suffices to guarantee that the component 22 cannot rotate with the lock nut 25. The internal resistance of the first transmission including the gears 2a and 2b assists the friction wheels 3–5 in holding the component 22 against rotation when the motor 9 is actuated and the motor 8 is idle.

When the loosening of the lock nut 25 is completed, the motor 8 is started to rotate the friction wheels 3–5 and the component 22 in a clockwise or in a counterclockwise direction. At such time, the motor 9 is idle and thus ensures (assisted by the internal resistance of the second transmission including the gears 6a and 6b) that the lock nut 25 does not rotate while the motor 8 is on to rotate the component 22 in a clockwise or in a counterclockwise direction. When the component 22 assumes the selected or desired angular position, the motor 8 is arrested and the motor 9 is started to drive the lock nut 25 against the end face of the steering knuckle 24 and to thus lock the component 22 in the newly selected angular position. The device 42 (e.g., a friction clutch) indicates or determines the magnitude of torque which is needed to rotate the lock nut 25 and thus enables the operator to lock the component 22 in the desired angular position with a requisite force. The device 41 monitors and indicates the angular position of the wrench 7.

In the next step, the motors including the piston rods 36 shift the carriage 30 back to the solid-line position of FIG. 4 so that the wrench 7 is disengaged from the lock nut 25. The motor 9 is then started again while the operator observes the device 41 to ensure that the wrench 7 is moved to a predetermined angular position, namely to a position in which the slots 7b and 26a extend upwardly, as viewed in the drawing, and the apparatus is ready to be applied to the component 22 in the next vehicle. As mentioned above, the device 41 can be replaced by a limit switch or any other means which can adequately pinpoint the angular position of the wrench 7. Such positioning of the slots 7b and 26a is also desirable and necessary for the purpose of detaching the apparatus from the freshly adjusted component 22, i.e., for the purpose of providing a path for movement of the component 22 relative to the wrench 7 and gear 26 when the housing 1 is thereupon lowered through the medium of the arms 40 in order to disengage the apparatus from the part 22.

An important advantage of the improved apparatus is its compactness as well as its versatility. Thus, the two transmissions can be confined in a common housing 1 which can be readily manipulated by way of the arms 40 to move the friction wheels 3–5 into and from engagement with the component 22 and to move the wrench 7 into or from engagement with the lock nut 25. Compressed air and/or pressurized hydraulic fluid is readily available in an assembly plant for automotive vehicles and/or in a repair shop so that the energy requirements of the improved apparatus can be met regardless of whether the apparatus is used to adjust the component 22 in an assembled vehicle or during assembly of a new automobile. It is even possible to program the operations of the various motors so that the loosening of lock nut 25, adjustment of the component 22, tightening of the lock nut 25 and movement of the wrench 7 and friction wheel 5 to proper positions for separation of the apparatus from the adjusted component 22 can take place in a semiautomatic or even in a fully automatic way.

It will be readily appreciated that the improved apparatus is not limited to use in connection with the adjustment of tie rods in automotive vehicles. It can be put to use wherever an externally threaded component requires axial adjustment which must be preceded by loosening of a lock nut and followed by tightening of the nut.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for changing the angular position of an externally threaded tie rod in the steering system of an automotive vehicle and of a lock nut which normally holds the tie rod against rotation, comprising a support; a motor-driven first transmission carried by said support and having first output means movable into engagement with the tie rod to rotate the tie rod, said first output means comprising a plurality of clamping wheels defining a space for reception of a portion of the tie rod, at least one of said wheels being movable to and from an inoperative position in which it provides a path for introduction and withdrawal of a portion of the tie rod into and from said space, and means for moving said one wheel to and from said inoperative position, said first transmission further comprising means for rotating at least one of said wheels in the same direction; a powered second transmission carried by said support and including second output means movable into torque transmitting engagement with the nut on the tie rod, said second output means comprising a tubular wrench having a socket for the nut on the tie rod, said wrench further having a substantially radially extending slot so that it can be moved into and from a position in which it surrounds a portion of the tie rod and its socket registers with the nut on such tie rod preparatory to movement of the wrench axially of the nut to a position in which the nut is received in said socket, said second transmission further comprising means for rotating said wrench in clockwise and counter-clockwise directions about a predetermined axis which is parallel to the axes of said wheels, said means for rotating said wrench comprising a plurality of driver gears and a driven gear rigid with said wrench, said driven gear having a slot in register with the slot of said wrench and said driven gear being in mesh with at least one of said driver gears in each angular position thereof, said support including a common housing for said transmissions, said housing having an open end and said first and second output means being accessible at the open end of said housing; and means for moving said wrench axially relative to the wheels so as to effect entry of the nut into said socket and separation of the wrench from the nut, said means for moving the wrench axially comprising a carriage reciprocably mounted in said support and supporting said wrench, and motor means for reciprocating said carriage relative to said support in at least substantial parallelism with the axes of said wheels.

2. The apparatus of claim 1, wherein said means for rotating said wrench further comprises additional gears in the form of a gear train provided on said carriage and meshing with said driver gears and means for driving said additional gear.

3. The apparatus of claim 1, wherein said means for reciprocating said carriage comprises at least one cylinder and piston unit.

4. The apparatus of claim 1, wherein said carriage comprises guide means for directing the tie rod into the slots of said driven gear and said wrench.

5. The apparatus of claim 4, wherein said guide means has surfaces converging toward the slots of said driven gear and said wrench.

6. The apparatus of claim 1, further comprising means for holding said support and coupling means connecting said support to said holding means for pivotal movement about an axis which is at least substantially normal to the axis of said wrench.

7. The apparatus of claim 1, further comprising a fluid-operated motor for said second transmission.

8. The apparatus of claim 1, further comprising motor means for said second transmission and means for operating said motor means so as to place said slot in a predetermined angular position.

9. The apparatus of claim 1, further comprising motor means for said second transmission and means for regulating the torque which is transmitted by said motor means.

* * * * *